United States Patent
Bebo

(10) Patent No.: US 10,051,987 B2
(45) Date of Patent: Aug. 21, 2018

(54) TEA AND COFFEE BREWING APPARATUS WITH TELESCOPING FILTER HOUSING

(71) Applicant: Joel Bebo, Denver, CO (US)

(72) Inventor: Joel Bebo, Denver, CO (US)

(73) Assignee: Joel Bebo, Denver, CO (US)

( * ) Notice: Subject to any disclaimer, the term of this patent is extended or adjusted under 35 U.S.C. 154(b) by 42 days.

(21) Appl. No.: 15/413,722

(22) Filed: Jan. 24, 2017

(65) Prior Publication Data

US 2017/0231418 A1     Aug. 17, 2017

Related U.S. Application Data

(60) Provisional application No. 62/295,841, filed on Feb. 16, 2016.

(51) Int. Cl.
*A47J 31/10* (2006.01)
*A47J 31/06* (2006.01)
*A47J 31/02* (2006.01)

(52) U.S. Cl.
CPC .......... *A47J 31/0626* (2013.01); *A47J 31/02* (2013.01); *A47J 31/06* (2013.01); *A47J 31/10* (2013.01)

(58) Field of Classification Search
CPC .. A47J 31/02; A47J 31/06; A47J 31/10; A47J 31/0626
See application file for complete search history.

(56) References Cited

U.S. PATENT DOCUMENTS

| | | | | |
|---|---|---|---|---|
| 1,366,824 | A | * | 1/1921 | Nicholls .................. A47J 31/02 99/319 |
| 4,627,334 | A | * | 12/1986 | Shanklin .................. A47J 31/02 220/8 |
| 6,065,609 | A | * | 5/2000 | Lake ........................ A47J 31/02 206/0.5 |
| 2015/0157163 | A1 | * | 6/2015 | Lin .......................... A47J 31/02 99/322 |

FOREIGN PATENT DOCUMENTS

DE         3632279 A1 *  4/1987 .............. A47J 31/02
JP    2002345650 A  * 12/2002

* cited by examiner

*Primary Examiner* — Daniel J Colilla
(74) *Attorney, Agent, or Firm* — Joel Bebo

(57) ABSTRACT

Tea and coffee brewing apparatus includes a container for receiving a brewed beverage and a filter receptacle for receiving contents to be brewed. Guides are disposed on the filter receptacle for lowering the filter receptacle wholly inside the container for storage mode and also raising the filter receptacle above the container for brew mode. Supports disposed on the guides hold the filter receptacle up and above the container so that a beverage may be drip brewed into the container.

4 Claims, 7 Drawing Sheets

TEA AND COFFEE BREWING APPARATUS WITH TELESCOPING FILTER HOUSING

BACKGROUND OF THE INVENTION

The present invention is in the field of beverage brewing. More specifically, the present invention is in the technical field of coffee and tea beverage brewing.

The utilization of cone shaped wetted filtration devices are common methods used for brewing coffee beverages where a pour over drip technique may be incorporated. Many of the conventional pour over brewing systems are static, stationary devices in part or whole of the assembly. Conventional pour over drip brewers contain a cone shaped filter housing and the receiving container as a single static device and is not collapsible. Though these systems may be light in weight, they are generally perceived to be an appliance where it does not travel well due to its bulkiness or delicate material of construction.

Other pour over drip coffee brewing devices are simply stand-alone filter housings that are designed to sit on top of a non-native receiving vessel such as a common drinking mug. Though these stand-alone filter housings may be small, portable, and/or durable, in order to initiate and complete the brewing process you will need to have a separate common drinking vessel at the ready. Generally the non-native drinking vessels used are not sealable, so you may not be able to transport post brew. This also means the need to keep 2 separate apparatus on hand that are not native to each other.

SUMMARY OF THE INVENTION

The present invention is a portable pour over drip coffee brewing system with a telescoping filter housing, container, and lid. The combination of these main components are in a self-contained brewing apparatus allowing the user to easily transport the device in a compact form while the filter housing is retracted inside the native container. Prior to brewing pour over style coffee, the filter housing is extended out of the container where the receptacle support is set in place to rest on the housing support to allow the filter housing to rest directly over the container. The filter housing then receives a filter and coffee grinds for the purpose of brewing coffee. This arrangement allows for a pour over drip coffee method to be used where the brewed coffee is filtered into and is received by the native container. Once coffee brewing is complete, the user may either set the filter housing aside or retract the filter housing back inside the container and secure the lid to consume or transport the beverage.

DETAILED DESCRIPTION OF THE INVENTION

Detailed illustrations of the invention can be referenced in FIG. 1, FIG. 2, FIG. 3, FIG. 4, FIG. 5, FIG. 6, and FIG. 7. The orientation of the invention shown in FIG. 2 will be commonly referenced as drip coffee brew mode. While in drip coffee brew mode the filter housing A is extended above the container B so the receptacle support 3 of the filter housing A rests on the housing support 4 of the container B. In the referenced drip coffee brew mode, the filter 12 is seated in the filter receptacle 1 so that it may receive coffee grinds and hot water for brewing coffee. The brewed coffee will then flow through the filter 12 and bottom of the filter receptacle 1 and fall into the receiving container B. The filter receptacle 1 and subsequent filter 12 may be a cone shape, flat bottom cone shape, or flat bottom shape. The filter receptacle 1 and filter 12 do not necessarily need to be two separate components and may be combined into a single component if desired. The filter housing A may be constructed from metal, ceramic, glass, plastic or a combination thereof. The filter 12 may be constructed out of paper that may be disposed of after each use or may be constructed with metal or plastic with perforations for multi-use functionality.

Figure 1:
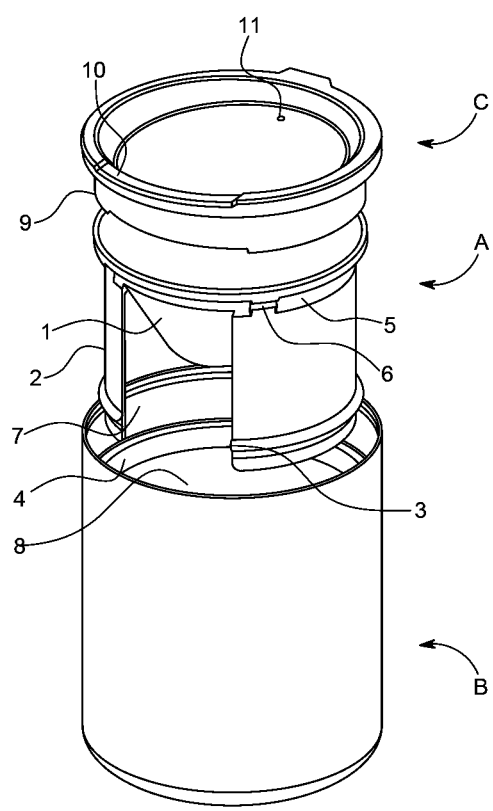
FIG. 1 is an exploded perspective view of the present invention.
Figure 2:
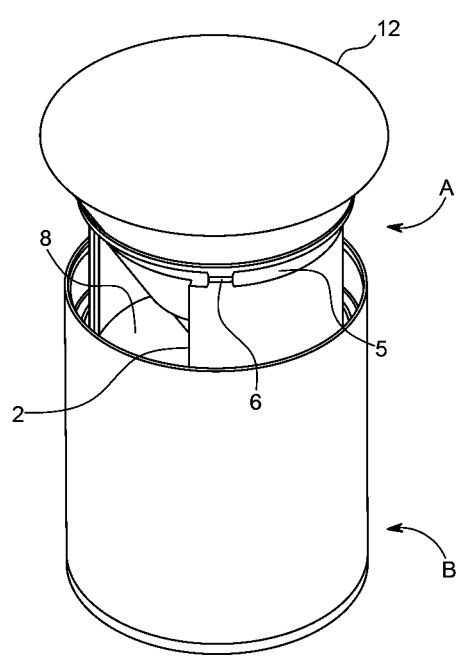
FIG. 2 is a perspective view of the present invention with the filter housing extended in coffee brewing mode shown with a disposable filter.
Figure 3:
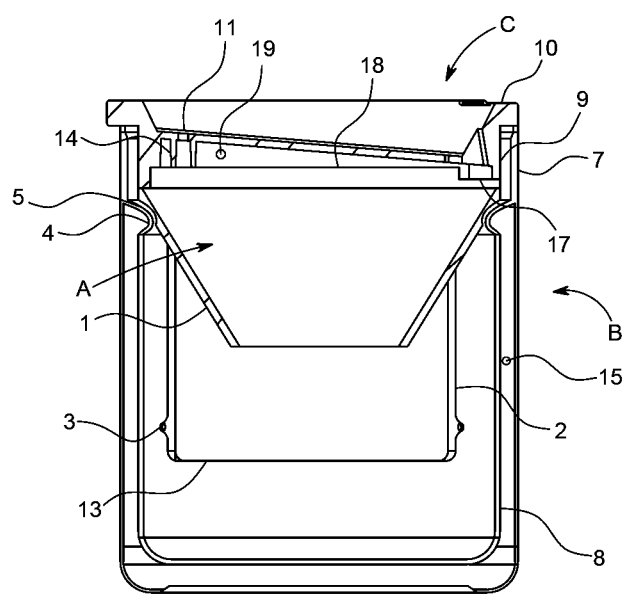
FIG. 3 is a section view of the present invention with the filter housing retracted inside container with lid fastened.
Figure 4:
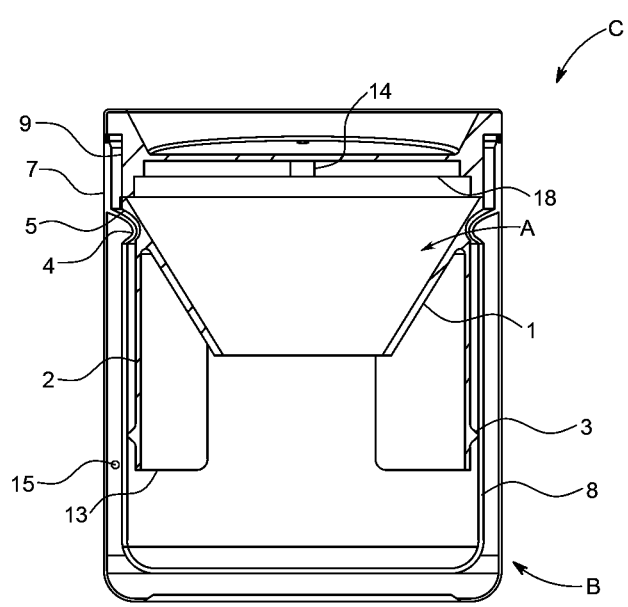
FIG. 4 is a section view perpendicular to FIG. 3.

After the drip coffee brewing process is complete the filter housing A with filter 12 and expended coffee grinds may be lifted off of the container B and set aside so that the lid C may be used to seal the container B for either transport or consumption. Alternatively, expended coffee grinds may be removed or disposed of so that the filter housing A may be retracted back inside the container B and lid C may be used to seal the container B for either transport or consumption. Refer to FIG. 3 and FIG. 4 showing how the filter housing A nests inside the container B with the lid C in place. The orientation referred to in FIG. 3 and FIG. 4 will be commonly referenced as retracted mode. While in retracted mode the user may transport the system as a whole with or without any beverage inside, consume the brewed beverage, brew tea, or brew cold coffee as will be explained in this specification. The container B may be constructed from metal, ceramic, glass, plastics or a combination thereof. The lid C may be constructed from metal, ceramic, glass, plastic or a combination thereof.

The present invention is illustrated with quantity two receptacle guides 2 as a feature of the filter housing A. The receptacle guides 2 are attached to the filter receptacle 1 and are cantilevered on opposite ends. The receptacle guides 2 must be rigid enough to support the filter receptacle 1, but flexible enough to allow for the featured receptacle support 3 to be pressed radially inward to pass the housing support 4 allowing the filter housing A to telescope axially in and out of the container B in a concentric fashion. Concentricity during telescoping is maintained via tight tolerance gap of the receptacle support 3 against the container body 8 as well as the tight tolerance gap of the receptacle guides 2 against the housing support 4. This is the use method for converting the present invention from drip coffee brew mode to retracted mode and vice versa.

Figure 5:
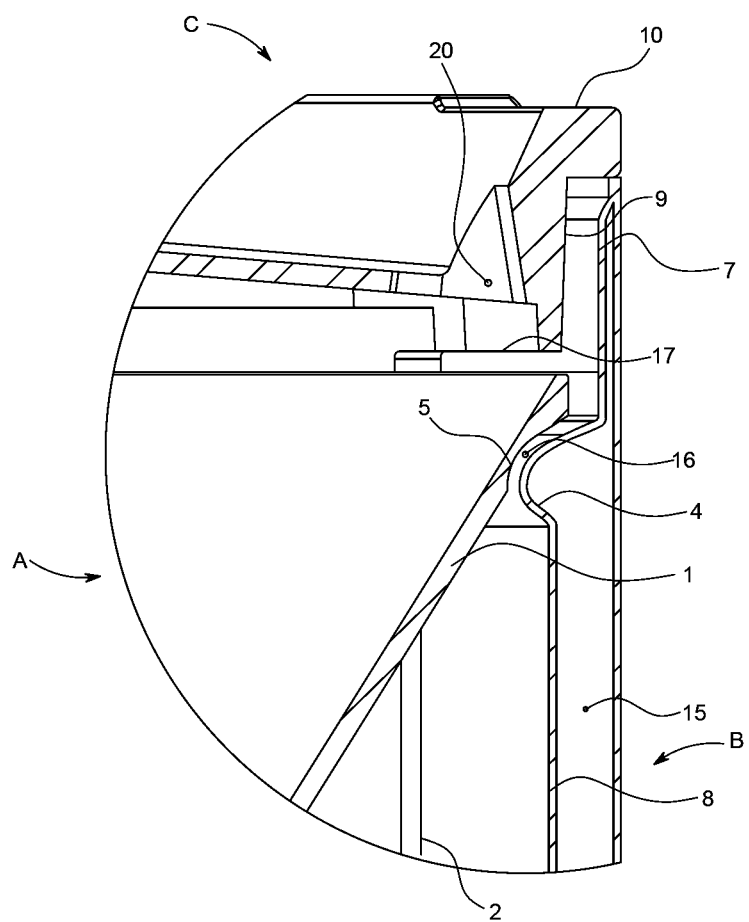
FIG. 5 is a detailed section view of the flow passage while filter housing is retracted inside the container.
Figure 6:
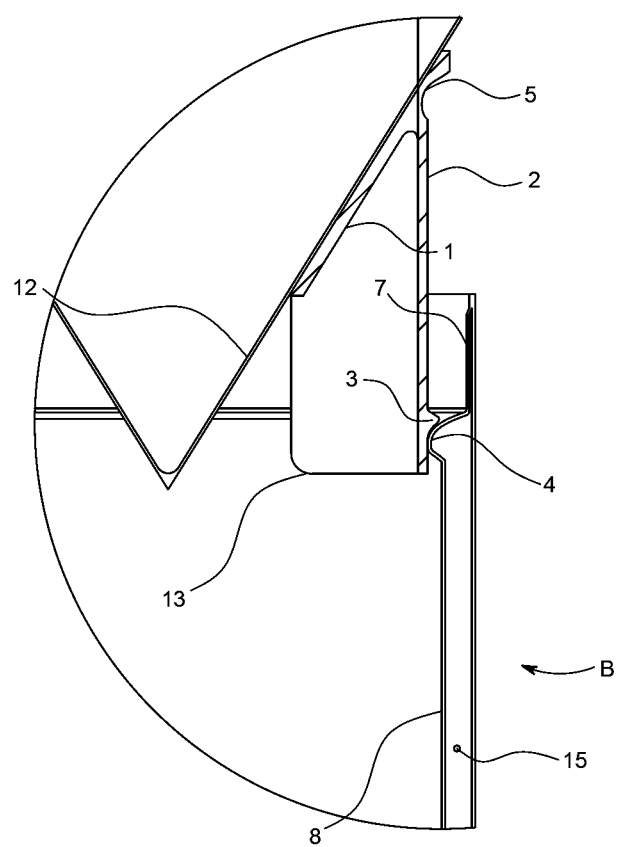
FIG. 6 is a detailed section view of the present invention with the filter housing extended in drip coffee brew mode shown with a disposable filter.
Figure 7:
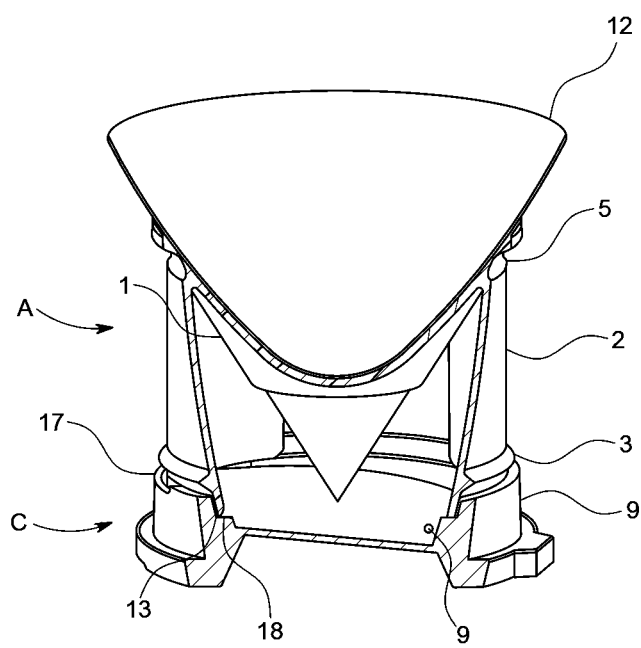
FIG. 7 is a partial section view of the filter housing set on top of the inverted lid, where the lid has a dual functionality as a saucer.

It is intended that in retracted mode a person may drink the brewed beverage with minimal flow restrictions to the mouth hole 20 with help from the gap features of the flow passage 16 and flow indent 17. The flow passage 16 is the gap made possible by flow passage indent 5, a recess, on the outer edge of the filter housing A. This flow passage indent 5 is directly adjacent to the flow passage seat 6 and while flow passage seat 6 makes contact with and rests on the housing support 4 in retracted mode, the recessed flow passage indent 5 forms the flow passage 16. Flow indent 17 is a feature on the underside of the lid C that also plays a role in allowing adequate flow of the beverage being consumed while the invention is in retracted mode. FIG. 5 is a detailed view of the gap featured as flow passage 16 between the filter housing A and container B as well as the gap created by the flow indent 17 between the underside of the lid C and the top of filter housing A. These are all feature that minimize obstructed flow of the beverage to the mouth hole 20 when in retracted mode where the filter housing A is nestled inside the container B with lid C secured on top.

The container receiver 9 and lid receiver 7 may feature compatible screw threads to mate one another into place. If threads are not used, the container receiver 9 and lid receiver 7 may feature plain walls for a press fit configuration as long as proper gasketing allows for a snug fit and seal between the container receiver 9 and lid receiver 7. The present invention also features vacuum insulation 15 between the outer wall and inner wall of the container B to provide minimal thermal loss of the beverage inside the container B.

While inverted, the lid C has a secondary function as a saucer and provide a clean surface for the filter housing A to sit while outside of the container B. In further detail, the lid C may be used as a place to set the filter housing A with filter 12 and expended coffee grinds after the brew process is complete. Reference FIG. 7 where the lid C is used to hold the filter housing A and lid C is used as a saucer to capture residual drippings from the expended coffee grinds. This arrangement will be commonly referenced as saucer mode. The housing seat 18 is an indented platform feature on the underside of the lid C to receive the housing support 13 when in saucer mode. Since the wetted filter 12 and coffee grinds will naturally drip residual liquids, the drip collector 19 will serve as a reservoir to collect these drippings for later disposal. Should a vent hole 11 be utilized on the lid C, the vent well 14 will form a barrier between the collected liquid and vent hole 11 so the collected liquid does not spill onto the surface. The mouth indent 10 is a recess on the outer rim of the lid C to prevent the area a person may place their mouth for sipping from getting soiled while the lid C is flipped upside down in saucer mode.

Contrary to drip coffee brewing that occurs when the present invention is in drip coffee brew mode, the present invention allows tea brewing to be accomplished in the aforementioned retracted mode with slightly modified filter receptacle 1 optimized for tea brewing. The receptacle guide 2, receptacle support 3, housing support 4, flow passage seat 6, and inner container body 8 play the same role in telescoping the filter housing A while brewing tea as it does in drip coffee brewing. The tea brewing process varies from drip coffee brewing since brewing tea requires full immersion of the tea leaves in the brewing medium inside the container while in the aforementioned retracted mode. The same principle may be applied when cold brewed coffee method is used where coffee grinds need full immersion in the brewing medium while in retracted mode. When cold brew coffee method is used or when brewing tea, the aforementioned drip coffee brew mode is used for draining the expended coffee grinds or tea leaves after brewing is completed during full immersion.

The advantages of the present invention include, without limitation, the ability for a person to perform pour over drip coffee beverage brewing using an all-inclusive apparatus that also collapses into a natively compact system that is easy to transport. The container B doubles as a drinking vessel as well as a storage housing for the filter housing A. The telescoping filter housing A may be utilized in brewing coffee and tea beverages as well as a draining mechanism for the expended tea leaves and coffee grinds depending on the style of brewing. The lid C with all its features may also provide a clean surface to rest the filter housing A when filter housing A is out of the container B where the lid C would function as a saucer plate for the expended tea leaves and coffee grinds.

In broad embodiment, the present invention is a tea and coffee brewing apparatus.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. Tea and Coffee Brewing Apparatus comprising:
   a container including an open end and a closed end, to receive a brewed beverage;
   a filter receptacle for receiving contents for brewing the brewed beverage;
   a guide means disposed on the filter receptacle, whereby allowing the filter receptacle to be concentrically and slidably positioned wholly inside the container for storage thereof and, from the aforementioned position of storage, allow the filter receptacle to be concentrically and slidably extended above the container for the process of drip brewing a beverage;
   a support means disposed on the guide means, further configured to flexure radially for passing an opposing support structure on the container, once passed, the support means rest atop the support structure of the container, thereby allowing the filter receptacle to be raised from inside the container and, to rest directly above the container for the purpose of drip brewing a beverage.

2. Tea and Coffee Brewing Apparatus according to claim 1, further comprising a lid for affixing to the open end of the container, wholly encapsulating and storing the filter receptacle inside the container.

3. Tea and Coffee Brewing Apparatus according to claim 2, further comprising an opening on the lid, whereby the opening allows for the consumption of the brewed beverage in the container while the lid is affixed;
   flow passage means disposed as intermittent recesses along the outer perimeter of the filter receptacle, providing gaps between the inner walls of the container and the filter receptacle while the filter receptacle is stored inside the container, thereby allowing the brewed beverage inside the container to pass through the flow passage means and, expelled out of the opening on the lid for consumption when the filter receptacle is also stored inside.

4. Tea and Coffee Brewing Apparatus according to claim 2, wherein the lid functions as a drip collection plate when flipped upside down on a surface.

* * * * *